United States Patent
Hayashi et al.

(10) Patent No.: US 10,670,776 B2
(45) Date of Patent: Jun. 2, 2020

(54) ANTIREFLECTION FILM, DISPLAY DEVICE IN WHICH SAID ANTIREFLECTION FILM IS USED, AND METHOD FOR SELECTING ANTIREFLECTION FILM

(71) Applicant: DAI NIPPON PRINTING CO., LTD., Tokyo (JP)

(72) Inventors: Mariko Hayashi, Okayama (JP); Tomohiko Shimatsu, Kawasaki (JP); Seiji Shinohara, Okayama (JP); Hiroshi Nakamura, Shanghai (CN)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 84 days.

(21) Appl. No.: 15/559,737

(22) PCT Filed: Mar. 16, 2016

(86) PCT No.: PCT/JP2016/058385
§ 371 (c)(1),
(2) Date: Sep. 19, 2017

(87) PCT Pub. No.: WO2016/152691
PCT Pub. Date: Sep. 29, 2016

(65) Prior Publication Data
US 2018/0045857 A1    Feb. 15, 2018

(30) Foreign Application Priority Data

Mar. 20, 2015  (JP) ................. 2015-058262
Mar. 20, 2015  (JP) ................. 2015-058267

(51) Int. Cl.
| | |
|---|---|
| *G02B 1/10* | (2015.01) |
| *G02B 1/111* | (2015.01) |
| *G02B 1/14* | (2015.01) |
| *B32B 7/02* | (2019.01) |
| *B05D 5/06* | (2006.01) |
| *G06F 3/044* | (2006.01) |

(Continued)

(52) U.S. Cl.
CPC ................ *G02B 1/111* (2013.01); *B05D 5/06* (2013.01); *B32B 7/02* (2013.01); *G02B 1/14* (2015.01); *G06F 3/044* (2013.01); *B32B 7/12* (2013.01); *B32B 23/04* (2013.01); *B32B 27/06* (2013.01); *B32B 27/28* (2013.01); *B32B 27/281* (2013.01); *B32B 27/302* (2013.01); *B32B 27/308* (2013.01); *B32B 27/32* (2013.01); *B32B 27/34* (2013.01); *B32B 27/36* (2013.01); *B32B 27/365* (2013.01); *B32B 2255/10* (2013.01); *B32B 2255/26* (2013.01); *B32B 2255/28* (2013.01); *B32B 2270/00* (2013.01); *B32B 2274/00* (2013.01); *B32B 2307/402* (2013.01); *B32B 2307/412* (2013.01); *B32B 2307/418* (2013.01); *B32B 2307/422* (2013.01); *B32B 2307/546* (2013.01); *B32B 2307/584* (2013.01); *B32B 2307/732* (2013.01); *B32B 2457/202* (2013.01); *B32B 2457/206* (2013.01); *B32B 2457/208* (2013.01); *G06F 2203/04103* (2013.01)

(58) Field of Classification Search
CPC .. G02B 1/111; G02B 1/14; G02B 1/11; G02B 1/12; G02B 1/16; G02B 1/18; G02B 1/105; G02B 1/113; G02B 1/115; G02B 1/116; G02B 1/118; G02B 5/0242; G02B 5/0294; G02B 5/286; G02B 5/3033; G06F 3/044; G06F 2203/04103; B05D 5/06; B32B 7/02; G02F 1/0063; G02F 1/133502; G02F 1/133308
See application file for complete search history.

(56) References Cited

U.S. PATENT DOCUMENTS

| | | |
|---|---|---|
| 2007/0188871 A1 | 8/2007 | Fleury et al. |
| 2009/0104385 A1 | 4/2009 | Reymond et al. |
| 2009/0117342 A1 | 5/2009 | Lee et al. |

(Continued)

FOREIGN PATENT DOCUMENTS

| | | |
|---|---|---|
| CN | 2743870 Y | 11/2005 |
| CN | 101714314 A | 5/2010 |

(Continued)

OTHER PUBLICATIONS

International Search Report for PCT/JP2016/058385, dated Jun. 21, 2016, 5 pages including English translation.

*Primary Examiner* — Mustak Choudhury
(74) *Attorney, Agent, or Firm* — Hamre, Schumann, Mueller & Larson, P.C.

(57) ABSTRACT

To provide an antireflection film that is excellent in color uniformity while suppressing the reflectance. An antireflection film containing a transparent substrate having thereon a high refractive index layer and a low refractive index layer, the antireflection film having a luminous reflectance Y value, which is measured with a specimen containing the antireflection film and a black board adhered on a side of the transparent substrate opposite to the high refractive index layer through a transparent adhesive, that satisfies the following condition (1), and an a* value and a b* value of the Lab color coordinate system, which are measured with the specimen, that satisfy the particular condition: <Condition (1)> assuming that an incident angle of light incident perpendicularly on a surface of the specimen on a side of the low refractive index layer is 0 degree, when light is made incident on the specimen at an incident angle of 5 degrees, specularly reflected light of the incident light has a luminous reflectance Y value of 0.50% or less.

12 Claims, No Drawings

(51) Int. Cl.
  *B32B 27/28* (2006.01)
  *B32B 27/36* (2006.01)
  *B32B 27/34* (2006.01)
  *B32B 27/30* (2006.01)
  *B32B 7/12* (2006.01)
  *B32B 23/04* (2006.01)
  *B32B 27/06* (2006.01)
  *B32B 27/32* (2006.01)

(56) References Cited

U.S. PATENT DOCUMENTS

| | | |
|---|---|---|
| 2010/0079049 A1 | 4/2010 | Kubota et al. |
| 2014/0049827 A1* | 2/2014 | Fujii .................. G02B 1/113 359/586 |
| 2015/0355383 A1 | 12/2015 | Kishi et al. |
| 2016/0091632 A1* | 3/2016 | Shimatsu .................. G02B 1/11 359/581 |
| 2016/0208131 A1 | 7/2016 | Suzuki |

FOREIGN PATENT DOCUMENTS

| | | | |
|---|---|---|---|
| JP | 2002122703 A | | 4/2002 |
| JP | 2004138662 A | * | 5/2004 |
| JP | 2004138662 A | | 5/2004 |
| JP | 2007-501766 | | 2/2007 |
| JP | 2008-250266 | | 10/2008 |
| JP | 2009015066 A | | 1/2009 |
| JP | 2009529715 A | | 8/2009 |
| JP | 2010152311 A | | 7/2010 |
| JP | 2012-226056 | | 11/2012 |
| JP | 2014-092616 | | 5/2014 |
| JP | 2014-167621 | | 9/2014 |
| JP | 2014206688 A | | 10/2014 |
| JP | 5637327 B1 | | 12/2014 |
| JP | 2015-007280 | | 1/2015 |
| JP | 2008-310119 | | 12/2018 |
| WO | 2012147876 A1 | | 11/2012 |
| WO | 2015/025836 | | 2/2015 |

* cited by examiner

ANTIREFLECTION FILM, DISPLAY DEVICE IN WHICH SAID ANTIREFLECTION FILM IS USED, AND METHOD FOR SELECTING ANTIREFLECTION FILM

FIELD OF INVENTION

The present invention relates to an antireflection film, a display device using the antireflection film, and a method for selecting an antireflection film.

BACKGROUND OF INVENTION

In association with the transition to terrestrial digital broadcasting in recent years, display devices capable of displaying a super high definition image are being developed. For preventing the image quality of the super high definition display devices from being impaired, the surface of the display device is demanded to have a capability of preventing outside light from being reflected.

Major examples of the measure for preventing outside light from being reflected include an antiglare treatment for reducing specularly reflected light with surface unevenness, and an antireflection treatment for reducing the reflectance through an interference effect of a multilayer thin film. In recent years, the antireflection treatment, which is easy to provide a high-quality image, is being brought into the mainstream.

The reflectance and the coloration can be reduced more by increasing the number of layers of the multilayer thin film, but most products utilizes an interference effect of two to four layers in view of the cost-benefit performance. Examples of the antireflection film of this type include one described in PTL 1.

In recent years, even an antireflection film utilizing an interference effect of two to four layers is demanded to have an ultra low reflectance of 0.50% or less for preventing the image quality of the super high definition display device from being impaired.

In association with the super high definition display devices achieved in recent years, users are not concerned by pixels even in display devices having a large screen, and consequently display devices having a large screen are being further spread. In the display device having a large screen, the outgoing angle becomes large at the right and left ends of the screen even though the screen is viewed from the front. In a display device having a touch-sensitive panel represented by a tablet type portable information terminal, the outgoing angle may become large at the right and left ends of the screen in some cases even though the display device does not have a large screen since the distance between the screen and the eyes of the user is short (for example, in the case where the display device is used in the lateral position). Furthermore, in a display device having a convex shape, the outgoing angle becomes large at the right and left ends thereof. Accordingly, the uniformity in color over a range having various outgoing angles (which may be hereinafter referred to as "color uniformity") is receiving increasing attention.

The reflectance and the coloration of the antireflection reflection film having a multilayer thin film are managed by the specularly reflected light of light with an incident angle of 5 degrees for reducing the reflectance and the coloration in the front direction. However, even though the specularly reflected light of light with an incident angle of 5 degrees shows suppressed values for the reflectance and the coloration, the color uniformity may be insufficient in some cases.

CITATION LIST

Patent Literature

PTL 1: JP-A-2010-152311

SUMMARY OF INVENTION

Technical Problem

An object of the present invention is to provide an antireflection film that is excellent in color uniformity while suppressing the reflectance, a display device using the antireflection film, and a method for selecting an antireflection film.

Solution to Problem

The present inventors have made earnest investigations for solving the problem, and have found that in an antireflection film with a problem in coloration, the coloration tends to be recognized in the observation at an angle apart from the front direction (e.g., around 30 to 45 degrees). As a result of further earnest investigations by the present inventors, it has been found that the angle dependency of the coloration can be suppressed by managing the coloration not in the front direction but by managing at an angle apart from the front direction, and thus the present invention has been completed.

The present invention provides the antireflection film, the display device using the antireflection film, and the method for selecting an antireflection film shown below.

[1] An antireflection film containing a transparent substrate having thereon a high refractive index layer and a low refractive index layer, the antireflection film having a luminous reflectance Y value and an a* value and a b* value of the Lab color coordinate system, which are measured with a specimen containing the antireflection film and a black board adhered on a side of the transparent substrate opposite to the high refractive index layer through a transparent adhesive, that satisfy the following condition (1) and satisfy at least any one of the following condition (2-1) and the following condition (3-1):

<Condition (1)> assuming that an incident angle of light incident perpendicularly on a surface of the specimen on a side of the low refractive index layer is 0 degree, when light is made incident on the specimen at an incident angle of 5 degrees, specularly reflected light of the incident light has a luminous reflectance Y value of 0.50% or less;

<Condition (2-1)> assuming that an incident angle of light incident perpendicularly on a surface of the specimen on a side of the low refractive index layer is 0 degree, when light is made incident on the specimen at an incident angle of from 5 degrees to 45 degrees at intervals of 5 degrees, specularly reflected light of the incident light is measured for an a* value and a b* value of the Lab color coordinate system, and a sum (S) of an absolute value of the a* value and an absolute value of the b* value is calculated at each of the incident angles, an incident angle $x_1$ (degree) that shows the minimum value ($S_{min}$) of the sum satisfies 20 degrees≤$x_1$≤30 degrees; and <Condition (3-1)> assuming that an incident angle of light incident perpendicularly on a surface of the specimen on a side of the low refractive index layer is 0 degree, when light is made incident on the specimen at an incident angle of from 5 degrees to 45 degrees at intervals of 5 degrees, specularly reflected light of the incident light is measured for an a* value and a b* value of the Lab color coordinate system, a square root of a square sum of the a* value and the b* value is calculated at each of the incident angles, and a slope of the square root of the square sum of the a* value and the b* value is calculated according to the following expression (A) among each of measurements, an angle x2 (degree) that shows an inflection point where the slope changes from negative to positive satisfies 25 degrees≤$x_2$:

$$\tan^{-1}[(\sqrt{(a^*_{n+1})^2+(b^*_{n+1})^2}-\sqrt{(a^*_n)^2+(b^*_n)^2})/5] \qquad (A)$$

wherein n represents an integer of from 1 to 8.

[2] A display device containing a display element having thereon the antireflection film according to the item [1] in such a manner that a side of the transparent substrate of the antireflection film is directed to a side of the display element.

[3] A method for selecting an antireflection film, containing: producing a specimen containing an antireflection film containing a transparent substrate having thereon a high refractive index layer and a low refractive index layer, and a black board adhered on a side of the transparent substrate opposite to the high refractive index layer through a transparent adhesive; and judging, as a judgement condition, whether a luminous reflectance Y value and an a* value and a b* value of the Lab color coordinate system, which are measured with the specimen, satisfy the condition (1) and satisfy at least any one of the condition (2-1) and the condition (3-1).

Advantageous Effects of Invention

The antireflection film and the display device of the present invention are excellent in color uniformity while suppressing the reflectance. The method for selecting an antireflection film of the present invention can precisely select an antireflection film that is excellent in color uniformity while suppressing the reflectance.

DESCRIPTION OF EMBODIMENTS

[Antireflection Film]

The antireflection film of the present invention is an antireflection film containing a transparent substrate having thereon a high refractive index layer and a low refractive index layer, and the antireflection film has a luminous reflectance Y value and an a* value and a b* value of the Lab color coordinate system, which are measured with a specimen containing the antireflection film and a black board adhered on a side of the transparent substrate opposite to the high refractive index layer through a transparent adhesive, that satisfy the following condition (1) and satisfy at least any one of the following condition (2-1) and the following condition (3-1).

<Condition (1)>

Assuming that an incident angle of light incident perpendicularly on a surface of the specimen on a side of the low refractive index layer is 0 degree, when light is made incident on the specimen at an incident angle of 5 degrees, specularly reflected light of the incident light has a luminous reflectance Y value of 0.50% or less.

<Condition (2-1)>

Assuming that an incident angle of light incident perpendicularly on a surface of the specimen on a side of the low refractive index layer is 0 degree, when light is made incident on the specimen at an incident angle of from 5 degrees to 45 degrees at intervals of 5 degrees, specularly reflected light of the incident light is measured for an a* value and a b* value of the Lab color coordinate system, and a sum (S) of an absolute value of the a* value and an absolute value of the b* value is calculated at each of the incident angles, an incident angle $x_1$ (degree) that shows the minimum value ($S_{min}$) of the sum satisfies 20 degrees≤$x_1$≤30 degrees.

<Condition (3-1)>

Assuming that an incident angle of light incident perpendicularly on a surface of the specimen on a side of the low refractive index layer is 0 degree, when light is made incident on the specimen at an incident angle of from 5 degrees to 45 degrees at intervals of 5 degrees, specularly reflected light of the incident light is measured for an a* value and a b* value of the Lab color coordinate system, a square root of a square sum of the a* value and the b* value is calculated at each of the incident angles, and a slope of the square root of the square sum of the a* value and the b* value is calculated according to the following expression (A) among each of measurements, an angle $x_2$ (degree) that shows an inflection point where the slope changes from negative to positive satisfies 25 degrees≤$x_2$:

$$\tan^{-1}[(\sqrt{(a^*_{n+1})^2+(b^*_{n+1})^2}-\sqrt{(a^*_n)^2+(b^*_n)^2})/5] \qquad (A)$$

wherein n represents an integer of from 1 to 8.

In the expression (A), the numeral "5" as denominator in the brackets shows "5 degrees" as the measurement intervals.

In the present invention, the transparent adhesive used in the specimen has a difference in refractive index from the refractive indices of the transparent substrate and the black board of 0.05 or less.

Condition (1)

The condition (1) shows that the luminous reflectance Y value of the antireflection film under the aforementioned measurement condition is 0.50% or less, which means in other words that the antireflection film has ultralow reflectance. In the case where the luminous reflectance Y value of the antireflection film exceeds 0.50%, there is a tendency that the angle dependency of the coloration can be suppressed, but the image quality of the super high definition display device is impaired due to the high luminous reflectance Y value.

In the condition (1), the luminous reflectance Y value is preferably 0.30% or less, more preferably 0.20% or less, and further preferably 0.15% or less.

The measurement condition of the condition (1) is preferably the viewing angle, the light source, and the measurement wavelength shown below.

Viewing angle: 2 degrees, light source: D65, measurement wavelength: 380 to 780 nm with intervals of 0.5 nm The luminous reflectance Y value herein means the Y value of the CIE 1931 standard color coordinate system.

Condition (2-1)

The condition (2-1) shows that when the sum (S) of the absolute value of the a* value and the absolute value of the b* value of the antireflection film is calculated under the aforementioned measurement condition, the incident angle $x_1$ (degree) that shows the minimum value ($S_{min}$) of the sum satisfies 20 degrees $x_1$≤30 degrees. In other words, the condition (2-1) shows that the incident angle $x_1$ (degree) that shows $S_{min}$ is not in the front direction, but at an angle apart from the front direction (e.g., an incident angle of from 20 to 30 degrees). The ordinary antireflection films have an incident angle that shows $S_{min}$ in the front direction, but in the condition (2-1), the incident angle that shows $S_{min}$ is deviated from the front direction.

In the condition (2-1), in the case where $x_1$ (degree) is less than 20 degrees, the coloration in the front direction can be suppressed, but strong coloration is observed at angles exceeding 20 degrees (particularly at from 35 to 45 degrees), and making the improvement of the color uniformity difficult. The reason therefore is considered as follows.

The sum (S) of the absolute value of the a* value and the absolute value of the b* value of the antireflection film has a tendency for increase in both the case where the incident angle is smaller than $x_1$ (degree) and the case where the incident angle is larger than $x_1$ (degree). Therefore, in the case where $x_1$ (degree) is less than 20 degrees, the sum (S) of the absolute value of the a* value and the absolute value of the b* value shows a large value at an angle apart from the front direction (e.g., approximately from 35 to 45 degrees), and thus the viewer tends to observe strong coloration. The value of 45 degrees herein is set since there is less frequency of observation of the display device at an angle exceeding 45 degree by the viewer.

In the condition (2-1), in the case where $x_1$ (degree) exceeds 30 degrees, it is difficult to suppress the reflectance and the coloration in the front direction.

In the case where the condition (2-1) is satisfied, on the other hand, the color uniformity can be easily improved. Specifically, the difference in coloration between near the center of the screen and near the both edges of the screen can be easily suppressed in the case where a display device having a large screen (screen size: 106.7 cm or more in diagonal size) is observed in the front direction, in the case where a display device having a touch-sensitive panel (screen size: more than 38.1 cm in diagonal size) is observed in the front direction, in the case where a display device having a convex shape is observed, and the like cases. Furthermore, in the case where the angle of viewing a display device is changed, the difference in coloration near the center of the screen before and after the movement can be easily suppressed.

The a* value and the b* value of the Lab color coordinate system in the condition (2-1) can be calculated by measuring the X value, the Y value, and the Z value of CIE XYZ of the specularly reflected light of the incident light, and converting the X value, the Y value, and the Z value thus obtained by the general conversion equation. The measurement condition of the condition (2-1) is preferably the viewing angle, the light source, and the measurement wavelength shown below.

Viewing angle: 2 degrees, light source: D65, measurement wavelength: 380 to 780 nm with intervals of 0.5 nm The same measurement condition as in the condition (2-1) is applied to the conditions (2-2) to (2-6) and the conditions (3-1) and (3-2) described later.

Condition (3-1)

The condition (3-1) shows that when the square root of the square sum of the a* value and the b* value is calculated at each of the incident angles from the measurement results of the a* value and the b* value under the aforementioned measurement condition, and a slope of the square root of the square sum of the a* value and the b* value is calculated according to the expression (A) among each of measurements, an angle $x_2$ (degree) that shows the inflection point where the slope changes from negative to positive satisfies 25 degrees≤$x_2$.

In the following description, the "slope of the square root of the square sum of the a* value and the b* value among each of measurements" may be referred to as "SL of the a* value and the b* value", and the "square root of the square sum of the a* value and the b* value" may be referred to as "SQ of the a* value and the b* value".

The angle $x_2$ (degree) that shows the inflection point where the SL of the a* value and the b* value changes from negative to positive means the angle where the SQ of the a* value and the b* value changes from decrease to increase.

The SQ of the a* value and the b* value can also be referred to as the so-called "chroma", and the ordinary antireflection films are designed to have a small value for the SQ of the a* value and the b* value in the front direction. The SQ of the a* value and the b* value shows the minimum value at the inflection point where the SL of the a* value and the b* value changes from negative to positive. Therefore, the ordinary antireflection films are designed to make the angle $x_2$ (degree) that shows the inflection point where the SL of the a* value and the b* value changes from negative to positive close to the front direction.

In the condition (3-1), on the other hand, the angle $x_2$ (degree) that shows the inflection point where the SL of the a* value and the b* value changes from negative to positive is deviated from the front direction to satisfy 25 degrees≤$x_2$.

In the condition (3-1), in the case where $x_2$ (degree) is less than 25 degrees, the color uniformity in the low angle region can be improved, but it is difficult to improve the color uniformity in the high angle region (particularly at from 35 to 45 degrees). The reason therefore is considered as follows.

The SQ of the a* value and the b* value of the antireflection film has a tendency for monotonic increase in both the case where the incident angle is smaller than $x_2$ (degree) and the case where the incident angle is larger than $x_2$ (degree). The increase rate of the SQ of the a* value and the b* value has a tendency of becoming larger on the side where the incident angle is larger than $x_2$ (degree). The increase rate of the SQ of the a* value and the b* value on the side where the incident angle is larger than $x_2$ (degree) has a tendency of reaching the peak at an angle apart from $x_2$ (degree) by a little larger than 20 degrees. Consequently, in the case where the angle $x_2$ (degree) is less than 25 degrees, the angle where the increase rate of the SQ of the a* value and the b* value reaches the peak is present in the region having a viewing angle of 45 degrees or less, in which the viewer frequently observes the display device, and thus the viewer tends to recognize an abrupt change in coloration. The abrupt change in coloration due to the change in angle tends to lead deterioration of the color uniformity.

In the case where the condition (3-1) is satisfied, on the other hand, the color uniformity can be easily improved. Specifically, the difference in coloration between near the center of the screen and near the both edges of the screen can be easily suppressed in the case where a display device having a large screen (screen size: 106.7 cm or more in diagonal size) is observed in the front direction, in the case where a display device having a touch-sensitive panel (screen size: more than 38.1 cm in diagonal size) is observed in the front direction, in the case where a display device having a convex shape is observed, and the like cases. Furthermore, in the case where the angle of viewing a display device is changed, the difference in coloration near the center of the screen before and after the movement can be easily suppressed.

In the condition (3-1), when $x_2$ (degree) is too large, it may be difficult to suppress the reflectance and the coloration in the front direction. Accordingly, x2 (degree) preferably satisfies the condition 25 degrees≤$x_2$≤40 degrees, more preferably satisfies the condition 25 degrees≤$x_2$≤35 degrees, and further preferably satisfies the condition 25 degrees≤$x_2$≤30 degrees.

In the condition (3-1), only one point is preferably present for the angle $x_2$ (degree) that shows the inflection point where the SL of the a* value and the b* value changes from negative to positive is preferably present, and plural points are preferably not present therefore. In other words, it is preferred that the SQ of the a* value and the b* value is gradually decreased until the inflection point, and is gradually increased from the inflection point to 45 degrees.

As described above, the color uniformity is improved in common in the condition (2-1) where the incident angle that shows $S_{min}$ is deviated from the front direction and in the condition (3-1) where the angle that shows the inflection point where the SL of the a* value and the b* value changes from negative to positive is deviated from the front direction.

The antireflection film of the present invention suffices to satisfy at least any one of the condition (2-1) and the condition (3-1), and preferably satisfy both the condition (2-1) and the condition (3-1).

In the case where the antireflection film of the present invention satisfies the condition (2-1), the antireflection film preferably further satisfies at least any one of the following conditions (2-2) to (2-6).

Condition (2-2)

In the antireflection film of the present invention, when a sum (5) of the absolute value of the a* value and the absolute value of the b* value is calculated at each of incident angles of from 5 to 45 degrees under the aforementioned measurement condition, an accumulated value ($SC_{5-45}$) of the sum preferably satisfies the following condition (2-2):

$$SC_{5-45} \leq 34.0 \qquad (2-2).$$

When $SC_{5-45}$ is 34.0 or less, the coloration can be more difficult to recognize in an angle region, in which the viewer frequently observes the display device, and the color uniformity can be further improved.

In the condition (2-2), $SC_{5-45}$≤32.0 is more preferably satisfied, and $SC_{5-45}$≤30.0 is further preferably satisfied. The lower limit of $SC_{5-45}$ may be approximately 15.0.

Condition (2-3)

In the antireflection film of the present invention, a sum ($S_5$) of the absolute value of the a* value and the absolute value of the b* value at an incident angle of 5 degree measured under the aforementioned measurement condition preferably satisfies the following condition (2-3):

$$2.2 \leq S_5 \leq 5.0 \qquad (2-3).$$

When $S_5$ is 2.2 or more, the antireflection film that satisfies the conditions (1) and (2) simultaneously can be easily obtained, and the color uniformity can be easily improved while suppressing the reflectance. When $S_5$ is 5.0 or less, the coloration in the front direction can be easily suppressed, and the color uniformity can be easily improved.

In the condition (2-3), 2.3≤$S_5$≤4.5 is more preferably satisfied, and 2.4≤$S_5$≤4.0 is further preferably satisfied.

Condition (2-4)

In the antireflection film of the present invention, a sum ($S_{45}$) of the absolute value of the a* value and the absolute value of the b* value at an incident angle of 45 degree measured under the aforementioned measurement condition preferably satisfies the following condition (2-4):

$$S_{45} \leq 8.0 \qquad (2-4).$$

When the condition (2-4) is satisfied, the coloration can be more difficult to recognize in an angle region, in which the viewer frequently observes the display device, and the color uniformity can be further improved.

In the condition (2-4), $S_{45}$≤7.5 is more preferably satisfied, and $S_{45}$≤6.5 is further preferably satisfied. The lower limit of S45 may be approximately 4.0.

Condition (2-5)

In the antireflection film of the present invention, a ratio of a sum ($S_5$) of the absolute value of the a* value and the absolute value of the b* value at an incident angle of 5 degree measured under the aforementioned measurement condition and the $S_{min}$ preferably satisfies the following condition (2-5):

$$1.6 \leq S_5/S_{min} \qquad (2-5).$$

The condition (2-5) shows that the coloration in the front direction (i.e., an incident angle of 5 degrees) is sufficiently larger than the minimum value ($S_{min}$) of the coloration. When the condition (2-5) is satisfied, the effect of the condition (2) can be more easily exhibited.

In the condition (2-5), 1.7≤$S_5/S_{min}$ is more preferably satisfied, and 1.8≤$S_5/S_{min}$ is further preferably satisfied. The upper limit of $S_5/S_{min}$ may be approximately 5.0.

Condition (2-6)

In the antireflection film of the present invention, when a sum (S) of the absolute value of the a* value and the absolute value of the b* value is calculated at each of incident angles of from 35 to 45 degrees under the aforementioned measurement condition, a standard deviation ($S\sigma_{35-45}$) of the sum preferably satisfies the following condition (2-6):

$$S\sigma_{35-45} \leq 1.65 \qquad (2-6).$$

When the condition (2-6) is satisfied, an abrupt change in coloration can be suppressed from being recognized when the viewer shifts the observation angle within a range of from 35 to 45 degrees, and the color uniformity can be improved.

In the condition (2-6), $S\sigma_{35-45}$≤1.60 is more preferably satisfied, and $S\sigma_{35-45}$≤1.50 is further preferably satisfied. It may be difficult to decrease the luminous reflectance Y value when $S\sigma_{35-45}$ is too small, and thus $S\sigma_{35-45}$ is preferably 0.50 or more, and more preferably 1.00 or more.

In the case where the antireflection film of the present invention satisfies the condition (3-1), the antireflection film preferably further satisfies the following condition (3-2).

Condition (3-2)

In the antireflection film of the present invention, when the square root of the square sum of the * value and the b* value is calculated at each of the incident angles of from 5 to 45 degrees, and an absolute value of a slope of the square root of the square sum of the a* value and the b* value is calculated according to the following expression (B) among each of measurements, a maximum value of the absolute values is preferably 17.3 or less:

$$|\tan^{-1}[(\sqrt{(a^*_{n+1})^2+(b^*_{n+1})^2}-\sqrt{(a^*_n)^2+(b^*_n)^2})/5]| \qquad (B)$$

wherein n represents an integer of from 1 to 8.

The absolute values of the SL of the a* value and the b* value show the difference in coloration of the antireflection film among the measurement, and more specifically show the extent of change of the coloration of the antireflection film with the change in angle. Therefore, the satisfaction of the condition (3-2) means that the coloration of the antireflection film does not abruptly change with the change in angle, and the color uniformity can be improved.

The maximum value ($SL_{max}$) of the absolute value of the SL of the a* value and the b* value calculated according to the expression (B) is preferably 17.0 or less, and more preferably 16.5 or less.

Structure of Antireflection Film

The antireflection film of the present invention has the basic structure containing a transparent substrate having thereon a high refractive index layer and a low refractive index layer. The high refractive index layer and the low refractive index layer have a function imparting an antireflection performance through an optical interference function of a multilayer thin film. The antireflection film may have an antireflection performance imparted thereto through an optical interference function of three or more layers by further providing an intermediate refractive index layer, but a multilayer structure with too many layers is not preferred from the standpoint of cost-benefit performance.

Accordingly, the antireflection film of the present invention preferably has an antireflection performance imparted thereto through an optical interference function of the two layers, i.e., the high refractive index layer and the low refractive index layer. In the case where a hardcoat layer described later is provided between the transparent substrate and the high refractive index layer, it is preferred that the hardcoat layer that has intermediate refractive index is used to impart an antireflection performance through an optical interference function of the three layers, i.e., the intermediate refractive index layer (i.e., the hardcoat layer), the high refractive index layer, and the low refractive index layer.

Transparent Substrate

The transparent substrate of the antireflection film is not particularly limited, as far as it is a transparent one that is generally used as a substrate of an antireflection film, and from the standpoint of the material cost, the productivity and the like, a plastic film, a plastic sheet or the like may be preferably appropriately selected according to the purpose of use.

Examples of the plastic film and the plastic sheet include those formed of various synthetic resins. Preferred examples of the synthetic resin include a cellulose resin, such as a triacetyl cellulose resin (TAC), a diacetyl cellulose resin, a cellulose acetate butyrate resin, and cellophane; a polyester resin, such as a polyethylene terephthalate resin (PET), a polybutylene terephthalate resin, a polyethylene naphthalate isophthalate copolymer resin, and a polyester thermoplastic elastomer; a polyolefin resin, such as a low density polyethylene resin (including a linear low density polyethylene resin), a medium density polyethylene resin, a high density polyethylene resin, an ethylene-α-olefin copolymer, a polypropylene resin, a polymethylpentene resin, a polybutene resin, an ethylene-propylene copolymer, a propylene-butene copolymer, an olefin thermoplastic elastomer, and mixtures of these polymers; an acrylic resin, such as a polymethyl (meth)acrylate resin, a polyethyl (meth)acrylate resin, and a polybutyl (meth)acrylate resin; a polyamide resin, such as nylon 6 and nylon 66; a polystyrene resin; a polycarbonate resin; a polyarylate resin; and a polyimide resin.

The transparent substrate may be a single material or a mixture of two or more materials selected from the aforementioned plastic films and plastic sheet, and from the standpoint of the flexibility, the toughness, the transparency and the like, a cellulose resin and a polyester resin are preferred, and a triacetyl cellulose resin (TAC) and a polyethylene terephthalate resin (PET) are more preferred.

The thickness of the transparent substrate is not particularly limited and may be appropriately selected according to the purpose of use, but the thickness is generally from 5 to 130 μm, and in consideration of the durability, the handleability and the like, the thickness is preferably from 10 to 100 μm.

Hardcoat Layer

The antireflection film preferably has a hardcoat layer between the transparent substrate and the high refractive index layer, for enhancing the scratch resistance of the antireflection film. The hardcoat layer herein means a layer that shows a hardness of H or higher in terms of the pencil hardness test defined in JIS K5600-5-4:1999.

The hardcoat layer may be formed, for example, with a hardcoat layer coating composition containing a curable resin composition. Examples of the curable resin composition include a thermosetting resin composition and an ionizing radiation-curable resin composition, and from the standpoint of the scratch resistance, an ionizing radiation-curable resin composition is preferred.

The thermosetting resin composition is a composition that contains at least a thermosetting resin, and is a resin composition that is cured by heating.

Examples of the thermosetting resin include an acrylic resin, a urethane resin, a phenol resin, a urea melamine resin, an epoxy resin, an unsaturated polyester resin, and a silicone resin. The thermosetting resin composition contains the thermosetting resin and, in addition, a curing agent depending on necessity.

The ionizing radiation-curable resin composition is a composition that contains a compound having an ionizing radiation-curable functional group (which may be hereinafter referred to as an ionizing radiation-curable compound). Examples of the ionizing radiation-curable functional group include an ethylenic unsaturated group, such as a (meth)acryloyl group, a vinyl group, and an allyl group, an epoxy group, and an oxetanyl group. The ionizing radiation-curable compound is preferably a compound having an ethylenic unsaturated group, and more preferably a compound having two or more ethylenic unsaturated groups, and among these, a polyfunctional (meth)acrylate compound having two or more ethylenic unsaturated groups is further preferred. As the polyfunctional (meth)acrylate compound, any of a monomer and an oligomer may be used.

The ionizing radiation means a radiation that has an energy quantum capable of polymerizing or crosslinking molecules, among electromagnetic waves and charged particle radiations. In general, an ultraviolet ray (UV) or an electron beam (EB) may be used, and in addition, an electromagnetic wave, such as an X-ray and a y-ray, and a charged particle radiation, such as an a-ray and an ion beam, may also be used.

Examples of the bifunctional (meth)acrylate monomer as the polyfunctional (meth)acrylate compound include ethylene glycol di(meth)acrylate, bisphenol A tetraethoxydiacrylate, bisphenol A tetrapropoxydiacrylate, and 1,6-hexanediol diacrylate.

Examples of trifunctional or higher functional (meth)acrylate monomer include trimethylolpropane tri(meth)acrylate, pentaerythritol tri(meth)acrylate, pentaerythritol tetra(meth)acrylate, dipentaerythritol hexa(meth)acrylate, dipentaerythritol tetra(meth)acrylate, and isocyanuric acid-modified tri(meth)acrylate.

The (meth)acrylate monomer may have a modified partial molecular structure, and examples thereof include those modified with ethylene oxide, propylene oxide, caprolactone, isocyanuric acid, an alkyl group, a cyclic alkyl group, an aromatic group, bisphenol, or the like.

Examples of the polyfunctional (meth)acrylate oligomer include an acrylate polymer, such as a urethane (meth)

acrylate, an epoxy (meth)acrylate, a polyester (meth)acrylate, and a polyether (meth)acrylate.

The urethane (meth)acrylate may be obtained, for example, through reaction of a polyhydric alcohol, an organic diisocyanate, and a hydroxy (meth) acrylate.

Preferred examples of the epoxy (meth)acrylate include a (meth)acrylate obtained by reacting a trifunctional or higher functional aromatic epoxy resin, alicyclic epoxy resin, aliphatic epoxy resin or the like, and (meth)acrylic acid, a (meth)acrylate compound obtained by reacting a bifunctional or higher functional aromatic epoxy resin, alicyclic epoxy resin, aliphatic epoxy resin or the like, a polybasic acid, and (meth)acrylic acid, and a (meth)acrylate obtained by reacting a bifunctional or higher functional aromatic epoxy resin, alicyclic epoxy resin, aliphatic epoxy resin or the like, a phenol compound, and (meth)acrylic acid.

The ionizing radiation-curable compound may be used solely or as a combination of two or more kinds thereof.

In the case where the ionizing radiation-curable compound is an ultraviolet ray-curable compound, the ionizing radiation-curable composition preferably contains an additive, such as a photopolymerization initiator and a photopolymerization accelerator.

Examples of the photopolymerization initiator include at least one selected from acetophenone, benzophenone, an a-hydroxyalkylphenone, a Michler's ketone, benzoin, benzyldimethylketal, benzoyl benzoate, an α-acyloxime ester, and a thioxanthone compound. The photopolymerization initiator preferably has a melting point of 100° C. or more. When the melting point of the photopolymerization initiator is 100° C. or more, a phenomenon in which the remaining photopolymerization initiator is sublimated with heat in the formation of the transparent conductive film or the crystallization process to thereby reduce resistance of the transparent conductive film may be prevented. The same preferred embodiment for a photopolymerization initiator may be applied to the case described later where a photopolymerization initiator is used in the high refractive index layer and the low refractive index layer.

The photopolymerization accelerator may enhance the curing rate through the reduction of polymerization inhibition due to the air on curing, and examples thereof include at least one selected from isoamyl p-dimethylaminobenzoate and ethyl p -dimethylaminobenzoate.

The thickness of the hardcoat layer is preferably in a range of from 0.1 to 100 μm, and more preferably in a range of from 0.8 to 20 μm. When the thickness of the hardcoat layer is in the range, a sufficient hardcoat capability may be obtained, by which cracks and the like may be prevented from occurring on application of an external impact, so as to prevent breakage.

The thickness of the hardcoat layer, and the thicknesses of the high refractive index layer and the low refractive index layer described later may be measured, for example, such a manner that on a cross sectional image of the layer obtained with a scanning electron microscope (SEM), a transmission electron microscope (TEM) or a scanning transmission electron microscope (STEM), the layer is measured for thickness in 20 points, and the average of the measured values in the 20 points is designated as the thickness. An SEM is preferably used in the case where the thickness to be measured is in a μm order, and a TEM or an STEM is preferably used in the case where the thickness to be measured is in a nanometer order. For an SEM, the acceleration voltage is preferably from 1 to 10 kV, and the magnification is preferably from 1,000 to 7,000, and for a TEM or an STEM, the acceleration voltage is preferably from 10 to 30 kV, and the magnification is preferably from 50,000 to 300,000.

The refractive index of the hardcoat layer is preferably smaller than the refractive index of the high refractive index layer described later, more preferably from 1.45 to 1.70, and further preferably from 1.45 to 1.60. The case where the refractive index of the hardcoat layer is in the range is preferred from the standpoint of the facility of the aforementioned various conditions since the hardcoat layer may function as the intermediate refractive index layer to enable the interference function of the three layers, i.e., the intermediate refractive index layer (i.e., the hardcoat layer), the high refractive index layer, and the low refractive index layer. From the standpoint of the suppression of interference fringes, the difference between the refractive index of the hardcoat layer and the refractive index of the transparent substrate is preferably small.

Examples of the measure for imparting the function of the intermediate refractive index layer to the hardcoat layer include a measure of mixing a resin having a high refractive index in the coating composition for forming the hardcoat layer, and a measure of mixing particles having a high refractive index therein. In the case where particles having a high refractive index are mixed, whitening and coating defects may occur due to the aggregation of the particles in some cases, and therefore the former measure (i.e., mixing a resin having a high refractive index) is preferred.

Examples of the resin having a high refractive index include the thermosetting resins and the ionizing radiation-curable compounds described above having introduced thereto a group containing sulfur, phosphorus, or bromine, an aromatic ring, or the like. Examples of the particles having a high refractive index include the same materials as described for the high refractive index particles used in the high refractive index layer described later.

The refractive indices of the hardcoat layer, and the high refractive index layer and the low refractive index layer described later may be calculated, for example, by fitting of the reflectance spectrum measured with a reflection photometer and the reflectance spectrum calculated from an optical model of a multilayer thin film using the Fresnel coefficient.

The hardcoat layer may be formed, for example, in such a manner that the curable resin composition and depending on necessity, the additive, such as an ultraviolet ray absorbent and a leveling agent, are mixed with a diluting solvent to prepare a coating composition for forming a hardcoat layer, and the coating composition is coated on the transparent substrate by a known coating method, dried, and depending on necessity, cured through irradiation with an ionizing radiation, thereby forming the hardcoat layer.

High Refractive Index Layer

The high refractive index layer may be formed, for example, with a coating composition for a high refractive index layer containing a curable resin composition and high refractive index particles.

The high refractive index layer preferably has a higher refractive index from the standpoint of imparting an ultra low reflectance to the antireflection film, but a large amount of the high refractive index particles are required for increasing the refractive index, which may cause whitening due to the aggregation of the high refractive index particles. Accordingly, the refractive index is preferably from 1.55 to 1.85, and more preferably from 1.56 to 1.70.

The thickness of the high refractive index layer is preferably 200 nm or less, and more preferably from 50 to 180 nm. In the case where the high refractive index layer has the two-layer structure described later, the total thickness of the two layers preferably satisfies the aforementioned range.

The high refractive index layer may be formed of plural layers each satisfying the aforementioned range of the refractive index, and is preferably formed of two or less layers, and more preferably a single layer, from the standpoint of the cost-benefit performance.

Examples of the high refractive index particles include antimony pentoxide (1.79), zinc oxide (1.90), titanium oxide (2.3 to 2.7), cerium oxide (1.95), tin-doped indium oxide (1.95 to 2.00), antimony-doped tin oxide (1.75 to 1.85), yttrium oxide (1.87), and zirconium oxide (2.10). The numerals in the parentheses are refractive indices of the materials constituting the particles.

Among these kinds of high refractive index particles, those having a refractive index exceeding 2.0 are preferred from the standpoint of the achievement of the preferred refractive index with a small amount thereof added. The high refractive index particles that have conductivity, such as antimony pentoxide, tin-doped indium oxide (ITO), and antimony-doped tin oxide (ATO), have free electrons having a plasma oscillation frequency that is in the near infrared region, and light in the visible region is also partially absorbed or reflected due to the plasma oscillation of the free electrons, resulting in difficulty in suppression of the coloration in some cases. Accordingly the high refractive index particles are preferably non-conductive particles.

In view of these factors, among the high refractive index particles described above, titanium oxide and zirconium oxide are preferred, and zirconium oxide is more preferred from the standpoint of the high durability and stability thereof, such as the light resistance. In the case where it is intended to impart antistatic property to the antireflection film, it is preferred that the high refractive index layer is formed to have the two-layer structure described later, and the conductive high refractive index particles are added to one of the layers.

The average particle diameter of the primary particles of the high refractive index particles is preferably from 5 to 200 nm, more preferably from 5 to 100 nm, and further preferably from 10 to 80 nm.

The average particle diameter of the primary particles of the high refractive index particles and the low refractive index particles described later can be calculated through the following operations (1) to (3).

(1) A film obtained by coating and drying the particles themselves or a dispersion liquid of the particles on a transparent substrate is pictured for a surface image with an SEM, a TEM or an STEM.

(2) Arbitrary 10 particles are extracted from the surface image, the respective particles are measured for the long diameter and the short diameter, and see an average diameter of the long diameter and the short diameter as the particle diameters of the respective particles. The long diameter is the longest diameter of the particle observed on the surface image, and the short diameter is obtained in such a manner that a line is drawn perpendicular to the line segment constituting the long diameter on the middle point of the line segment, and the distance between two points, at which the perpendicular line crosses the boundary of the particle, is designated as the short diameter.

(3) The operation (2) is performed for other surface images of the same specimen to thereby repeat the operation (2) five times, and the number average value of the particle diameters of 50 particles in total is designated as the average particle diameter.

In the calculation of the average particle diameter of the particles, an SEM is preferably used in the case where the average particle diameter to be calculated is in a μm order, and a TEM or an STEM is preferably used in the case where the average particle diameter to be calculated is in a nanometer order. For an SEM, the acceleration voltage is preferably from 1 to 10 kV, and the magnification is preferably from 1,000 to 7,000, and for a TEM or an STEM, the acceleration voltage is preferably from 10 to 30 kV, and the magnification is preferably from 50,000 to 300,000.

The content of the high refractive index particles is preferably from 30 to 400 parts by mass, more preferably from 50 to 200 parts by mass, and further preferably from 80 to 150 parts by mass, per 100 parts by mass of the curable resin composition, from the standpoint of the balance among the achievement of a high refractive index, the suppression of coloration, and the suppression of whitening.

The high refractive index layer is preferably subjected to dispersion stabilization for suppressing the excessive aggregation of the high refractive index particles. Examples of a measure for the dispersion stabilization include a measure of adding additional high refractive index particles to high refractive index particles being a base, in which the additional high refractive index particles have a surface charge amount that is smaller than the high refractive index particles being a base. According to the measure, the high refractive index particles being a base appropriately gather around the additional high refractive index particles, and thereby the high refractive index particles being a base can be suppressed from being excessively aggregated. Examples of the measure also include the use of the high refractive index particles that have been surface-treated, and the addition of a dispersant to the coating composition for the high refractive index layer.

Examples of the curable resin composition constituting the high refractive index layer include those described for the hardcoat layer, and an ionizing radiation-curable resin composition is preferred.

For providing the aforementioned refractive index while preventing the addition amount of the high refractive index particles from becoming excessive, the curable resin composition to be used preferably has a high refractive index. The refractive index of the curable resin composition is preferably approximately from 1.54 to 1.70.

The high refractive index layer may have a two-layer structure containing a high refractive index layer (A) positioned on the side of the hardcoat layer and a high refractive index layer (B) positioned on the side of the low refractive index layer. In this case, the refractive index of the high refractive index layer (B) is preferably higher than the refractive index of the high refractive index layer (A). The use of the structure of the high refractive index layer can increase the difference in refractive index from the low refractive index layer, and consequently the reflectance can be decreased, and the difference in refractive index between the high refractive index layer and the hardcoat layer can be decreased to suppress interference fringes from being formed.

In the case where the high refractive index layer is formed to have the two-layer structure, the refractive index of the high refractive index layer (A) is preferably from 1.55 to 1.70, and the refractive index of the high refractive index layer (B) is preferably from 1.60 to 1.85.

In the two-layer structure, it is preferred that conductive high refractive index particles are contained in one of the high refractive index layer (A) and the high refractive index layer (B), whereas non-conductive high refractive index particles are contained in the other thereof, and the thickness of the layer containing the conductive high refractive index particles is made smaller than the thickness of the layer containing the non-conductive high refractive index particles. According to the structure, antistatic property can be imparted while suppressing the amount of the conductive high refractive index particles which may be a factor of coloration. Furthermore, the conductive high refractive index particles are preferably used since the addition thereof may impart antistatic property with a small amount thereof through the network formation in the layer, which may result in the suppression of coloration and whitening.

The high refractive index layer may be formed, for example, in such a manner that the high refractive index particles, the curable resin composition, and depending on necessity, the additive, such as an ultraviolet ray absorbent and a leveling agent, are mixed with a diluting solvent to prepare a coating composition for forming the high refractive index layer, and the coating composition is coated on the hardcoat layer by a known coating method, dried, and depending on necessity, cured through irradiation with an ionizing radiation, thereby forming the high refractive index layer.

Low Refractive Index Layer

The low refractive index layer is provided on the high refractive index layer.

For imparting an ultra low reflectance to the antireflection film, the low refractive index layer preferably has a refractive index of from 1.26 to 1.36, more preferably from 1.28 to 1.34, and further preferably from 1.30 to 1.32.

The more the refractive index of the low refractive index layer is decreased, the more the refractive index of the antireflection film can be decreased without increasing the refractive index of the high refractive index layer excessively. On the other hand, when the refractive index of the low refractive index layer is too low, the strength of the low refractive index layer is tend to be lowered. Accordingly, the refractive index of the low refractive index layer is preferably within the aforementioned range, by which the amount of the high refractive index particles added to the high refractive index layer can be suppressed while retaining the strength of the low refractive index layer, thereby resulting in the suppression of coloration and whitening.

The thickness of the low refractive index layer is preferably from 80 to 120 nm, more preferably from 85 to 110 nm, and further preferably 90 to 105 nm.

The low refractive index layer may be formed of plural layers each satisfying the aforementioned range of the refractive index, and is preferably formed of two or less layers, and more preferably a single layer, from the standpoint of the cost-benefit performance.

The method for forming the low refractive index layer may be classified roughly into a wet method and a dry method. Examples of the wet method include a method of forming the layer by a sol-gel method using a metal alkoxide or the like, a method of forming the layer by coating a resin having a low refractive index, such as a fluorine resin, and a method of forming the layer by coating a coating composition for forming the low refractive index layer containing a resin composition and low refractive index particles. Examples of the dry method include a method of selecting particles having a desired refractive index from the low refractive index particles described later, and forming the layer by a physical vapor deposition method or a chemical vapor deposition method.

The wet method is excellent in production efficiency, and in the present invention, the low refractive index layer is preferably formed by, among the wet methods, the method of forming the layer by coating a coating composition for forming the low refractive index layer containing a resin composition and low refractive index particles.

The low refractive index particles are preferably used for decreasing the refractive index, i.e., for enhancing the antireflection characteristics, and while any of inorganic particles, such as silica and magnesium fluoride, and organic particles may be used without particular limitation, particles having a structure with voids by themselves are preferably used from the standpoint of the enhancement of the antireflection characteristics and the securement of the favorable surface hardness.

The particles having a structure with voids by themselves have minute voids thereinside, which are filled with a gas, such as the air having a refractive index of 1.0, and thus have a low refractive index by themselves. Examples of the particles having voids include inorganic and organic porous particles and hollow particles, and specific examples thereof include porous silica particles, hollow silica particles, and porous polymer particles and hollow polymer particles formed of an acrylic resin or the like. Preferred examples of the inorganic particles include silica particles having voids that are prepared by using the technique described in JP-A-2001-233611, and preferred examples of the organic particles include hollow polymer particles that are prepared by using the technique described in JP-A-2002-80503. The silica particles having voids and the porous silica particles have a refractive index in a range of from 1.18 to 1.44, which is lower than ordinary silica particles having a refractive index of approximately 1.45, and therefore are preferred from the standpoint of decreasing the refractive index of the low refractive index layer.

The hollow silica particles have a function of decreasing the refractive index of the low refractive index layer while retaining the strength of the coated film of the low refractive index layer. The hollow silica particles used in the present invention are silica particles that have a structure with a hollow thereinside. The refractive index of the hollow silica particles is lowered from the refractive index inherent to silica (approximately 1.45) inversely proportional to the occupancy of the hollow thereinside. Accordingly, the refractive index of the entire particles of the hollow silica particles may be from 1.18 to 1.44.

The hollow silica particles are not particularly limited, and may be, for example, particles that have an outer shell and a porous structure or a hollow inside the outer shell, and examples thereof include silica particles that are prepared by using the techniques described in JP-A-6-330606, JP-A-7-013137, JP-A-7-133105 and JP-A-2001-233611.

The average particle diameter of the primary particles of the low refractive index particles is preferably from 5 to 200 nm, more preferably from 5 to 100 nm, and further preferably from 10 to 80 nm. When the average particle diameter of the primary particles is in the range, the transparency of the low refractive index layer may not be impaired, and a good dispersion state of the particles may be obtained. In particular, the low refractive index particles are preferably hollow particles having an average particle diameter of from 70 to 80 nm since the porosity may be increased to lower the refractive index while retaining the thickness of the outer shell for preventing the strength from being short, and the particles have good balance to the thickness of the low refractive index layer that is optimum for decreasing the reflectance (approximately 100 nm).

The low refractive index particles used in the present invention are preferably surface-treated. The surface treatment for the low refractive index particles is preferably a surface treatment using a silane coupling agent, and more preferably a surface treatment using a silane coupling agent having a (meth)acryloyl group. The surface treatment applied to the low refractive index particles may enhance the affinity of the particles with the binder resin described later, so as to enhance the uniformity of the dispersion state of the particles, and to prevent the particles from being aggregated, and thus the phenomena due to the increase of the particle size due to the aggregation may be suppressed, such as the decrease of the transparency of the low refractive index layer, the deterioration of the coating property of the coating composition for forming the low refractive index layer, and the deterioration of the strength of the coated film of the coating composition.

In the case where the silane coupling agent has a (meth) acryloyl group, the silane coupling agent has ionizing radiation-curing property and thus is easily reacted with the binder resin described later, and therefore the low refractive index particles are favorably fixed to the binder resin inside the coated film of the coating composition for the low refractive index layer. In other words, the low refractive index particles function as a crosslinking agent in the binder resin. Accordingly, the entire coated film may be tightened, and thereby an excellent surface hardness can be imparted to the low refractive index layer while retaining the flexibility inherent to the binder resin. Consequently, the low refractive index layer may exhibit an absorbing capability and a restoring capability against external impacts through the deformation thereof due to the good flexibility, thereby suppressing scratches from being formed, and thus the layer may have a high surface hardness which exhibits excellent scratch resistance.

Examples of the silane coupling agent that is preferably used for the surface treatment to the low refractive index particles include 3-(meth)acryloxypropyltrimethoxysilane, 3-(meth)acryloxyp ropyltriethoxysilane, 3-(meth)acryloxypropylmethyldimethoxysilane, 3-(meth)acryloxypropylmethyldiethoxysialne, 2-(meth)acryloxypropyltrimethoxysilane, and 2-(meth)acryloxypropyltriethoxysilane.

The content of the low refractive index particles in the low refractive index layer is preferably from 10 to 250 parts by mass, more preferably from 50 to 200 parts by mass, and further preferably from 100 to 180 parts by mass, per 100 parts by mass of the resin in the low refractive index layer. When the content of the low refractive index particles is in the range, good antireflection characteristics and good surface hardness may be obtained.

The proportion of the hollow particles and/or the porous particles in the entire low refractive index particles contained in the low refractive index layer is preferably 70% by mass or more, more preferably 80% by mass or more, and further preferably from 80 to 95% by mass.

Examples of the resin composition contained in the coating composition for forming the low refractive index layer include a curable resin composition. The curable resin composition used may be the same ones as described for the hardcoat layer, and an ionizing radiation-curable resin composition is preferred.

Preferred examples of the resin composition also include a fluorine-containing polymer and a fluorine monomer that exhibit a low refractive index property by themselves. The fluorine-containing polymer is a polymer of a polymerizable compound that contains at least a fluorine atom in the molecule thereof, and is preferred since antifouling property and slipping property can be imparted. The fluorine-containing polymer preferably has a reactive group in the molecule thereof to function as a curable resin composition, and more preferably has an ionizing radiation-curable reactive group to function as an ionizing radiation-curable resin composition.

The fluorine-containing polymer preferably contains silicon in addition to fluorine, so as not only to repel contamination on the surface of the low refractive index layer, but also to impart good wipeability of the contamination thus repelled. Preferred examples thereof include a silicone-containing vinylidene fluoride copolymer obtained by adding a silicone component to a copolymer. Examples of the silicone component herein include (poly)dimethylsiloxane, (poly)diethylsiloxane, (poly)diphenylsiloxane, (poly)methylp henylsiloxane, alkyl-modified (poly)dimethylsiloxane, and azo group -containing (p oly)dimethylsiloxane, and also include dimethylsilicone, phenylmethylsilicone, alkylaralkyl- modified silicone, fluorosilicone, polyether-modified silicone, fatty acid ester-modified silicone, methyl hydrogen silicone, silanol group-containing silicone, alkoxy group-containing silicone, phenol group-containing silicone, methacryl-modified silicone, acrylic-modified silicone, amino-modified silicone, carboxylic acid-modified silicone, carbinol-modified silicone, epoxy-modified silicone, mercapto-modified silicone, fluorine-modified silicone, and polyether-modified silicone. Among these, a compound having a dimethylsiloxane structure is preferred.

The low refractive index layer may be formed, for example, in such a manner that the low refractive index particles, the resin composition, and depending on necessity, the additive, such as an ultraviolet ray absorbent and a leveling agent, are mixed with a diluting solvent to prepare a coating composition for forming the low refractive index layer, and the coating composition is coated on the high refractive index layer by a known coating method, dried, and depending on necessity, cured through irradiation with an ionizing radiation, thereby forming the low refractive index layer.

Properties of Antireflection Film

The antireflection film preferably has a total light transmittance (JIS K7361-1:1997) of 90% or more, and more preferably 92% or more. The antireflection film of the present invention preferably has a haze (JIS K7136:2000) of 1.0% or less, more preferably 0.5% or less, and further preferably 0.3% or less.

The light incident surface on measuring the total light transmittance and the haze is the side of the transparent substrate.

The surface of the antireflection film (the surface on the side of the low refractive index layer) preferably has an arithmetic average roughness Ra (JIS B0601:1994) of 10 nm or less, and more preferably from 1 to 8 nm. The surface of the antireflection film (the surface on the side of the low refractive index layer) preferably has a ten-point average roughness Rz (JIS B0601:1994) of 160 nm or less, and more preferably from 50 to 155 nm.

In the case where Ra and Rz are in the aforementioned ranges, the antireflection film may have smoothness and may be enhanced in scratch resistance.

The antireflection film of the present invention described above is excellent in color uniformity while suppressing the reflectance. In particular, the aforementioned effects can be easily exhibited in the case where the antireflection film is applied to a display device having a large screen with a screen size of 106.7 cm or more in diagonal size, a display device having a resolution with a number of pixels of 3,840×2,160, i.e., a so-called 4K resolution, or higher, a display device having a convex shape, and a display device having a touch-sensitive panel (screen size: more than 38.1 cm in diagonal size).

Display Device

The display device of the present invention contains a display element having thereon the antireflection film of the present invention described above in such a manner that a side of the transparent substrate of the antireflection film is directed to a side of the display element.

Examples of the display element constituting the display device include a liquid crystal display element, a plasma display element, and an organic EL display element.

The specific structure of the display element is not particularly limited. For example, the liquid crystal display element may have a basic structure containing a lower glass substrate, a lower transparent electrode, a liquid crystal layer, an upper transparent electrode, a color filter, and an upper glass substrate in this order, and in a super high definition liquid crystal display element, the lower transparent electrode and the upper transparent electrode are patterned at high density.

The display element is preferably has a resolution with a number of pixels of 3,840×2,160, i.e., a so-called 4K resolution, or higher. A super high definition display element having a 4K resolution or higher tends to receive influence of coloration due to the small light intensity per one pixel thereof. A display device equipped with a display element having a 4K resolution or higher has a large screen, and tends to suffer a problem in color uniformity. Accordingly, a display element having a 4K resolution or higher is preferred since the effects of the present invention can be easily exhibited.

Examples of the display element having a 4K resolution or higher include a display element having a number of pixels of 3,840×2,160 and a display element having a number of pixels of 4,096×2,160.

Even not having a 4K resolution or higher, a display device having a large screen with a screen size of 106.7 cm or more in diagonal size is preferred since the effects of the present invention can be easily exhibited.

A display device having a convex shape tends to suffer a problem in color uniformity and thus is preferred since the effects of the present invention can be easily exhibited.

The display device of the present invention may contain a touch-sensitive panel on the display element, and the antireflection film may be disposed on the touch-sensitive panel. In this embodiment, it is also necessary to dispose the antireflection film in such a manner that the side of the transparent substrate thereof is directed to the side of the display element. In the case of the display device having a touch-sensitive panel, the display device preferably has a screen size of more than 38.1 cm in diagonal size since the effects of the present invention can be easily exhibited.

Examples of the touch panel include a capacitance touch panel, a resistive film touch panel, an optical touch panel, an ultrasonic touch panel, and an electromagnetic induction touch panel.

The resistive film touch panel has a basic structure, in which one pair of transparent substrates each having a conductive film are disposed with a spacer intervening therebetween in such a manner that the conductive films are directed to each other, and a circuit is connected to the basic structure.

Examples of the capacitance touch panel include a surface type and a projection type, and a projection type is frequently used. The projection type capacitance touch panel has a basic structure, in which an X-axis electrode and a Y-axis, which is perpendicular to the X-axis electrode, are disposed with an insulator intervening therebetween, to which a circuit is connected. More specifically, examples of the basic structure include such embodiments as (1) the X-axis electrode and the Y-axis electrode are formed on different surfaces of one transparent substrate, respectively, (2) the X-axis electrode, the insulator layer, and the Y-axis electrode are formed in this order on a transparent substrate, and (3) the X-axis electrode is formed on a transparent substrate, whereas the Y-axis electrode is formed on another transparent substrate, and the transparent substrates are laminated on each other through an adhesive layer or the like. Examples thereof also include an embodiment, in which a still another transparent substrate is laminated on one of these basic structures.

In the display device having a touch-sensitive panel, the outgoing angle may become large at the right and left ends of the screen even though the display device does not have a large screen since the distance between the screen and the eyes of the user is short, and thus a problem in color uniformity tends to occur. Accordingly, the effects of the present invention can be easily exhibited by applying the antireflection film of the present invention to the display device having a touch-sensitive panel.

[Method for Selecting Antireflection Film]

The method for selecting an antireflection film of the present invention contains: producing a specimen containing an antireflection film containing a transparent substrate having thereon a high refractive index layer and a low refractive index layer, and a black board adhered on a side of the transparent substrate opposite to the high refractive index layer through a transparent adhesive; and judging, as a judgement condition, whether a luminous reflectance Y value and an a* value and a b* value of the Lab color coordinate system, which are measured with the specimen, satisfy the condition (1) and satisfy at least any one of the condition (2-1) and the condition (3-1).

<Condition (1)>

Assuming that an incident angle of light incident perpendicularly on a surface of the specimen on a side of the low refractive index layer is 0 degree, when light is made incident on the specimen at an incident angle of 5 degrees, specularly reflected light of the incident light has a luminous reflectance Y value of 0.50% or less.

<Condition (2-1)>

Assuming that an incident angle of light incident perpendicularly on a surface of the specimen on a side of the low refractive index layer is 0 degree, when light is made incident on the specimen at an incident angle of from 5 degrees to 45 degrees at intervals of 5 degrees, specularly reflected light of the incident light is measured for an a* value and a b* value of the Lab color coordinate system, and a sum (S) of an absolute value of the a* value and an absolute value of the b* value is calculated at each of the incident angles, an incident angle $x_1$ (degree) that shows the minimum value ($S_{min}$) of the sum satisfies 20 degrees$\leq x_1 \leq$30 degrees.

<Condition (3-1)>

Assuming that an incident angle of light incident perpendicularly on a surface of the specimen on a side of the low refractive index layer is 0 degree, when light is made incident on the specimen at an incident angle of from 5 degrees to 45 degrees at intervals of 5 degrees, specularly reflected light of the incident light is measured for an a* value and a b* value of the Lab color coordinate system, a square root of a square sum of the a* value and the b* value is calculated at each of the incident angles, and a slope of the square root of the square sum of the a* value and the b* value is calculated according to the following expression (A) among each of measurements, an angle $x_2$ (degree) that shows an inflection point where the slope changes from negative to positive satisfies 25 degrees≤$x_2$:

$$\tan^{-1}[(\sqrt{(a^*_{n+1})^2+(b^*_{n+1})^2}-\sqrt{(a^*_n)^2+(b^*_n)^2})/5] \quad (A)$$

wherein n represents an integer of from 1 to 8.

The judgement condition for selecting an antireflection film includes the condition (1) as an indispensable condition, and also includes at least any one of the condition (2-1) and the condition (3-1) as an indispensable condition. The judgement condition preferably includes all the condition (1), the condition (2-1), and the condition (3-1) as indispensable conditions.

In the method for selecting an antireflection film of the present invention, the judgement condition preferably includes one or more selected from the aforementioned conditions (2-2) to (2-6) and the aforementioned condition (3-2) as an additional judgement condition, and more preferably includes all the conditions (2-2) to (2-6) and the condition (3-2) as additional judgement conditions. The conditions (2-2) to (2-6) are preferably combined with the condition (2-1), and the condition (3-2) is preferably combined with the condition (3-1).

The numeral ranges in the conditions are preferably the preferred numeral ranges in the aforementioned antireflection film. For example, the judgement condition in the condition (1) is preferably a luminous reflectance Y value of 0.30% or less.

The antireflection film as an object to be selected in the present invention may have a layer other than the high refractive index layer and the low refractive index layer on the transparent substrate. For example, a hardcoat layer may be provided between the transparent substrate and the high refractive index layer.

The embodiments of the transparent substrate, the high refractive index layer, the low refractive index layer, and the hardcoat layer provided depending on necessity of the antireflection film selected by the method for selecting an antireflection film of the present invention are the same as the embodiments of the transparent substrate, the high refractive index layer, the low refractive index layer, and the hardcoat layer of the antireflection film of the present invention.

According to the method for selecting an antireflection film of the present invention, an antireflection film that has a low reflectance and is excellent in color uniformity can be precisely selected, and the quality of the antireflection film can be standardized.

EXAMPLES

The present invention will be described in more detail with reference to examples below, but the present invention is not limited to the examples.

1. Properties and Evaluation

The antireflection films obtained in Examples and Comparative Examples were measured and evaluated in the following manners. The results are shown in Tables 1 and 2.

1-1. Luminous Reflectance Y Value of Antireflection Film

A black board (refractive index: 1.49) was adhered on the side of the transparent substrate opposite to the high refractive index layer of the antireflection film through a transparent adhesive (refractive index: 1.49), thereby producing a specimen. Assuming that the incident angle of light incident perpendicularly on the surface of the specimen on the side of the low refractive index layer was 0 degree, when light was made incident on the specimen at an incident angle of 5 degrees, specularly reflected light of the incident light was measured for a luminous reflectance Y value.

The measurement device used for the luminous reflectance Y value was a spectral photometer (UV-2450, a trade name, produced by Shimadzu Corporation) with a viewing angle of 2 degrees, D65 as a light source, and a measurement wavelength of from 380 to 780 nm with intervals of 0.5 nm.

1-2. a* Value and b* Value of Lab Color Coordinate System of Antireflection Film Assuming that the incident angle of light incident perpendicularly on the surface of the specimen produced in the item 1-1 above on the side of the low refractive index layer was 0 degree, light was made incident on the specimen at an incident angle of from 5 degrees to 45 degrees at intervals of 5 degrees, and specularly reflected light of the incident light was measured for an a* value and a b* value of the Lab color coordinate system. The numerals relating to the conditions (2-1) to (2-6), (3-1), and (3-2) were calculated from the measurement results of the a* value and the b* value. The numerals relating to the conditions (2-1) to (2-6) are shown in Tables 1 and 2, and the numerals relating to the conditions (3-1) and (3-2) are shown in Tables 3 and 4.

The measurement device used for the a*value and the b* value was a spectral photometer (V-7100, a trade name, produced by Jasco Corporation) with a viewing angle of 2 degrees, D65 as a light source, and a measurement wavelength of from 380 to 780 nm with intervals of 0.5 nm.

1-3. Evaluation of Antireflection Performance of Antireflection Film

On a liquid crystal display element having a number of pixels of 3,840×2,160, the antireflection film was placed in such a manner that the side of the transparent substrate of the antireflection film was directed to the side of the liquid crystal display element, thereby producing a simulated liquid crystal display device. In a state where no image was displayed on the display element in a bright room, the reflection of the observer itself near the center of the surface (low refractive index layer) of the simulated liquid crystal display device was visually observed in the perpendicular direction of the simulated liquid crystal display device.

As a result, the case where the color of the skin of the reflected observer was not able to be recognized because of strong black was rated as "A", and the case where the color of the skin of the reflected observer was able to be recognized was rated as "C".

1-4. Color Uniformity of Antireflection Film

A fluorescent lamp was reflected on the specimen produced in the item 1-1 above, and the coloration of the surface of the specimen was observed from the position where the specularly reflected light was able to be confirmed. In the observation, the specimen was moved immediately under the fluorescent lamp in such a manner that the angle with respect to the fluorescent lamp was gradually changed from the perpendicularity (0 degree) to 45 degrees.

The observation was performed by 20 persons, and each of the persons evaluated in such a manner that a specimen that did not have a site where coloration was strongly observed or a site where abrupt change in coloration was observed was rated as 1 point, a specimen that had any one of the two sites was rated as 2 points, and a specimen that had both the two sites was rated as 3 points. A specimen that had an average value of the evaluations by the 20 persons of 1.1 points or less was rated as "AA", a specimen that had more than 1.1 points and 1.5 points or less was rated as "A", a specimen that had more than 1.5 points and 2.0 points or less was rated as "B", a specimen that had more than 2.0 points and 2.5 points or less was rated as "C", and a specimen that had more than 2.5 points and 3.0 points or less was rated as "D".

2. Production of Antireflection Film

Example 1

On a triacetyl cellulose film having a thickness of 80 μm (refractive index: 1.49), a coating composition for forming a hardcoat layer having the following formulation was coated, dried and irradiated with an ultraviolet ray, thereby forming a hardcoat layer having a thickness of 10 μm, a refractive index of 1.54 and a pencil hardness of 2H. Subsequently, on the hardcoat layer, a coating composition for forming a high refractive index layer having the following formulation was coated, dried and irradiated with an ultraviolet ray, thereby forming a high refractive index layer having a thickness of 150 nm and a refractive index of 1.63. Subsequently, on the high refractive index layer, a coating composition for forming a low refractive index layer having the following formulation was coated, dried and irradiated with an ultraviolet ray, thereby forming a low refractive index layer having a thickness of 100 nm and a refractive index of 1.30, and thus an antireflection film was provided.

<Preparation of Coating Composition for forming Hardcoat Layer>

1.6 parts by mass of a photopolymerization initiator (Irgacure 127, a trade name, produced by BASF AG, 2-hydroxy-1-(4-(4-(2-hydroxy-2-methylpropionyl)benzyl)phenyl)-2-methylpropan-1-one) was added to 58.3 parts by mass of a diluting solvent (methyl isobutyl ketone/cyclohexanone=8/2), and the mixture was agitated until no undissolved residue remained. 20 parts by mass of a photocurable resin (Beamset 577, a trade name, produced by Arakawa Chemical Industries, Ltd.) and 20 parts by mass of a high refractive index resin (Polylite RX-4800, produced by DIC Corporation) were added thereto, and the mixture was agitated until no undissolved residue remained. Finally, 0.1 parts by mass of a leveling agent (Seikabeam 10-28 (MB), a trade name, produced by Dainichiseika Color & Chemicals Mfg. Co., Ltd.) was added thereto, and the mixture was agitated to prepare a coating composition for forming a hardcoat layer.

<Preparation of Coating Composition for Forming High Refractive Index Layer>

0.1 parts by mass of a photopolymerization initiator (Irgacure 127, a trade name, produced by BASF AG) was added to 92.6 parts by mass of a diluting solvent (methyl isobutyl ketone/cyclohexanone/methyl ethyl ketone=4/2/4), and the mixture was agitated until no undissolved residue remained. 1.25 parts by mass of a photocurable resin (Beamset 577, a trade name, produced by Arakawa Chemical Industries, Ltd.) was added thereto, and the mixture was agitated until no undissolved residue remained. 6 parts by mass of zirconium oxide (MZ-230X, a trade name, produced by Sumitomo Osaka Cement Co., Ltd., solid content: 32.5% by mass, average primary particle diameter: 15 to 50 nm) and 0.05 part by mass of a leveling agent (Seikabeam 10-28 (MB), a trade name, produced by Dainichiseika Color & Chemicals Mfg. Co., Ltd.) were added thereto, followed by agitating, so as to prepare a coating composition for forming a high refractive index layer.

<Preparation of Coating Composition for Forming Low Refractive Index Layer>

0.2 parts by mass of a photopolymerization initiator (Irgacure 127, a trade name, produced by BASF AG) was added to 91.1 parts by mass of a diluting solvent (MIBK/AN=7/3), and the mixture was agitated until no undissolved residue remained. 1.0 part by mass of a photocurable resin (KAYARAD-PET-30, a trade name, produced by Nippon Kayaku Co., Ltd.), 7.6 parts by mass of hollow silica particles (solid content: 20% by mass, average primary particle diameter: 60 nm), and 0.1 part by mass of a leveling agent (Seikabeam 10-28 (MB), a trade name, produced by Dainichiseika Color & Chemicals Mfg. Co., Ltd.) were added thereto, followed by agitating, so as to prepare a coating composition for forming a low refractive index layer.

Example 2

An antireflection film was provided in the same manner as in Example 1 except that: the amount of the photocurable resin in the coating composition for forming the hardcoat layer in Example 1 was changed to 40 parts by mass, and the amount of the high refractive index resin therein was changed to 0 part by mass (resulting in a refractive index of 1.51 after changing); and the high refractive index layer was formed to have a two-layer structure by using, as a coating composition for forming the high refractive index layer (A) on the side of the hardcoat layer, the same coating composition for forming the high refractive index layer in Example 1 except that the zirconium oxide therein was changed to antimony-doped tin oxide (solid content: 45% by mass) to provide a thickness of 70 nm (resulting in a refractive index of 1.59 after changing), and as a coating composition for forming the high refractive index layer (B) on the side of the low refractive index layer, the same coating composition for forming the high refractive index layer in Example 1 to provide a thickness of 90 nm.

Example 3

An antireflection film was provided in the same manner as in Example 2 except that the thickness of the high refractive index layer (B) on the side of the low refractive index layer in Example 2 was changed to 105 nm.

Example 4

An antireflection film was provided in the same manner as in Example 3 except that: the thickness of the high refractive index layer (A) on the side of the hardcoat layer in Example 3 was changed to 60 nm; and the thickness of the high refractive index layer (B) on the side of the low refractive index layer therein was changed to 120 nm.

Comparative Example 1

An antireflection film was provided in the same manner as in Example 2 except that: the high refractive index layers (A) and (B) in Example 2 were not formed; and the amount of the photocurable resin in the coating composition for forming the low refractive index layer was changed to 2.0 parts by mass, and the amount of the hollow silica particles was changed to 6.6 parts by mass (resulting in a refractive index of 1.36 after changing).

Comparative Example 2

An antireflection film was provided in the same manner as in Example 2 except that: the high refractive index layer (B) in Example 2 was not formed; the amount of the photocurable resin in the coating composition for the high refractive index layer (A) was changed to 4.25 parts by mass, the amount of the antimony-doped tin oxide was changed to 3 parts by mass (resulting in a refractive index of 1.56 after changing), and the thickness thereof was changed to 160 nm; and the amount of the photocurable resin in the coating composition for the low refractive index layer was changed to 3.1 parts by mass, the amount of the hollow silica particles therein was changed to 5.5 parts by mass (resulting in a refractive index of 1.38 after changing), and the thickness thereof was changed to 90 nm.

Comparative Example 3

An antireflection film was provided in the same manner as in Example 1 except that the amount of the photocurable resin in the coating composition for forming the hardcoat layer in Example 1 was changed to 40 parts by mass, and the amount of the high refractive index resin therein was changed to 0 part by mass (resulting in a refractive index of 1.51 after changing).

Comparative Example 4

An antireflection film was provided in the same manner as in Example 3 except that the antimony-doped tin oxide in the coating composition for forming the high refractive index layer (A) on the side of the hardcoat layer in Example 3 was changed to antimony pentoxide (solid content: 40% by mass) (resulting in a refractive index of 1.58 after changing), and the thickness thereof was changed to 50 nm.

TABLE 1

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Sum of absolute value of a* value and absolute value of b* value for each incident angles | 5 degrees | 3.6 | 4.0 | 2.7 | 2.4 | 3.6 | 1.0 | 2.6 | 2.0 |
| | 10 degrees | 3.2 | 3.5 | 2.3 | 2.2 | 3.4 | 1.0 | 2.6 | 2.0 |
| | 15 degrees | 2.5 | 2.9 | 1.8 | 1.8 | 3.0 | 1.0 | 2.8 | 2.0 |
| | 20 degrees | 1.7 | 2.1 | 1.2 | 1.4 | 2.6 | 0.9 | 2.9 | 2.0 |
| | 25 degrees | 0.9 | 1.6 | 1.8 | 1.0 | 3.2 | 1.1 | 3.2 | 2.0 |
| | 30 degrees | 1.0 | 2.6 | 2.6 | 0.8 | 3.9 | 1.4 | 3.4 | 2.2 |
| | 35 degrees | 1.9 | 3.9 | 3.7 | 1.9 | 4.5 | 1.9 | 3.6 | 2.7 |
| | 40 degrees | 2.9 | 5.6 | 5.1 | 3.3 | 5.0 | 2.4 | 5.4 | 4.5 |
| | 45 degrees | 4.5 | 7.7 | 7.1 | 5.3 | 5.2 | 2.9 | 8.3 | 6.9 |

TABLE 2

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Condition (1) Y value | 0.13 | 0.09 | 0.05 | 0.12 | 0.77 | 0.87 | 0.12 | 0.15 |
| Condition (2-1) $x_1$ degree | 25 | 25 | 20 | 30 | 20 | 20 | 5 | 15 |
| Condition (2-2) $SC_{5-45}$ | 22.2 | 33.8 | 28.2 | 20.0 | 34.5 | 13.5 | 34.7 | 26.3 |
| Condition (2-3) $S_5$ | 3.6 | 4.0 | 2.7 | 2.4 | 3.6 | 1.0 | 2.6 | 2.0 |
| Condition (2-4) $S_{45}$ | 4.5 | 7.7 | 7.1 | 5.3 | 5.2 | 2.9 | 8.3 | 6.9 |
| Condition (2-5) $S_5/S_{min}$ | 4.1 | 2.5 | 2.3 | 2.9 | 1.4 | 1.1 | 1.0 | 1.0 |
| Condition (2-6) $S\sigma_{30-45}$ | 1.05 | 1.56 | 1.39 | 1.37 | 0.31 | 0.44 | 1.92 | 1.73 |
| Antireflection performance | A | A | A | A | C | C | A | A |
| Color uniformity | B | B | B | A | AA | AA | D | C |

As apparent from the results shown in Tables 1 and 2, it is understood that the antireflection films of Examples 1 to 4 satisfying the condition (1) and the condition (2-1) are excellent in color uniformity while having a good antireflection performance.

On the other hand, the antireflection films of Comparative Examples 1 and 2 do not satisfy the condition (1), and cannot suppress the reflectance. The antireflection films of Comparative Examples 3 and 4 has an incident angle xl (degree) showing the minimum value ($S_{min}$) of the sum (S) of the absolute value of the a* value and the absolute value of the b* value of less than 20 degrees, which does not satisfy the condition (2-1), and thus the sum (S) of the absolute values shows a large value at an angle apart from the front direction (e.g., approximately from 35 to 45 degrees), failing to improve the color uniformity.

parative Examples 3 and 4 does not satisfy the condition (3-1), and thus the coloration abruptly changes at an angle apart from the front direction (e.g., approximately from 35 to 45 degrees), failing to improve the color uniformity.

INDUSTRIAL APPLICABILITY

The antireflection film and the display device of the present invention are useful since they are excellent in color uniformity while suppressing the reflectance.

The invention claimed is:

1. An antireflection film comprising a transparent substrate having thereon a high refractive index layer and a low refractive index layer, the antireflection film having a luminous reflectance Y value and an a* value and a b* value of the Lab color coordinate system that satisfy the following

TABLE 3

|  |  | Example 1 | Example 2 | Example 4 | Comparative Example 1 | Comparative Example 2 | Comparative Example 3 | Comparative Example 4 |
|---|---|---|---|---|---|---|---|---|
| Square root of square sum of a* value and b* value for each incident angles | 5 degrees | 2.7 | 2.8 | 2.0 | 2.8 | 0.8 | 2.2 | 1.7 |
|  | 10 degrees | 2.4 | 2.5 | 1.8 | 2.7 | 0.8 | 2.1 | 1.6 |
|  | 15 degrees | 1.8 | 2.0 | 1.4 | 2.6 | 0.8 | 2.1 | 1.5 |
|  | 20 degrees | 1.2 | 1.6 | 1.0 | 2.5 | 0.9 | 2.1 | 1.4 |
|  | 25 degrees | 0.7 | 1.4 | 0.7 | 2.6 | 0.9 | 2.2 | 1.5 |
|  | 30 degrees | 0.7 | 1.9 | 0.8 | 2.8 | 1.0 | 2.6 | 1.8 |
|  | 35 degrees | 1.4 | 2.8 | 1.4 | 3.2 | 1.3 | 3.4 | 2.5 |
|  | 40 degrees | 2.1 | 4.0 | 2.4 | 3.6 | 1.7 | 4.6 | 3.6 |
|  | 45 degrees | 3.2 | 5.5 | 3.7 | 3.9 | 2.1 | 6.4 | 5.2 |
| Slope of square root of square sum of a* value and b* value among each of measurements | 5 degrees or more and less than 10 degrees | −3.9 | −3.8 | −2.5 | −0.8 | 0.3 | −0.3 | −1.0 |
|  | 10 degrees or more and less than 15 degrees | −6.0 | −5.3 | −4.0 | −1.5 | 0.4 | −0.4 | −1.4 |
|  | 15 degrees or more and less than 20 degrees | −7.0 | −5.3 | −4.6 | −0.5 | 0.3 | −0.2 | −0.9 |
|  | 20 degrees or more and less than 25 degrees | −6.4 | −1.5 | −4.1 | 0.7 | 0.3 | 1.8 | 0.8 |
|  | 25 degrees or more and less than 30 degrees | 0.3 | 4.9 | 0.9 | 2.6 | 1.6 | 4.5 | 4.1 |
|  | 30 degrees or more and less than 35 degrees | 7.8 | 10.1 | 7.3 | 4.4 | 3.3 | 8.7 | 8.1 |
|  | 35 degrees or more and less than 40 degrees | 8.3 | 13.5 | 11.1 | 4.9 | 4.4 | 13.5 | 12.3 |
|  | 40 degrees or more and less than 45 degrees | 12.6 | 17.1 | 15.2 | 3.8 | 4.7 | 19.3 | 17.4 |

TABLE 4

|  | Example 1 | Example 2 | Example 4 | Comparative Example 1 | Comparative Example 2 | Comparative Example 3 | Comparative Example 4 |
|---|---|---|---|---|---|---|---|
| Condition (1) Y value | 0.13 | 0.09 | 0.12 | 0.77 | 0.87 | 0.12 | 0.15 |
| Condition (3-1) $x_2$ degree | 25 or more and less than 30 | 25 or more and less than 30 | 25 or more and less than 30 | 20 or more and less than 25 | none | 20 or more and less than 25 | 20 or more and less than 25 |
| Condition (3-2) $SL_{max}$ | 12.6 | 17.1 | 15.2 | 4.9 | 4.7 | 19.3 | 17.4 |
| Antireflection performance | A | A | A | C | C | A | A |
| Color uniformity | B | B | A | AA | AA | D | C |

As apparent from the results shown in Tables 3 and 4, it is understood that the antireflection films of Examples 1, 2, and 4 satisfying the condition (1) and the condition (3-1) are excellent in color uniformity while having a good antireflection performance.

On the other hand, the antireflection films of Comparative Examples 1 and 2 do not satisfy the condition (1), and cannot suppress the reflectance. The antireflection films of Comcondition (1) and satisfy at least any one of the following condition (2-1) and the following condition (3-1):

<Condition (1)> assuming that an incident angle of light incident perpendicularly on a surface of the specimen on a side of the low refractive index layer is 0 degree, when light is made incident on the specimen at an incident angle of 5 degrees, specularly reflected light of the incident light has a luminous reflectance Y value of 0.20% or less;

<Condition (2-1)> assuming that an incident angle of light incident perpendicularly on a surface of the specimen on a side of the low refractive index layer is 0 degree, when light is made incident on the specimen at an incident angle of from 5 degrees to 45 degrees at intervals of 5 degrees, specularly reflected light of the incident light is measured for an a* value and a b* value of the Lab color coordinate system, and a sum (S) of an absolute value of the a* value and an absolute value of the b* value is calculated at each of the incident angles, an incident angle $x_1$ (degree) that shows the minimum value ($S_{min}$) of the sum satisfies 20 degrees≤$x_1$≤30 degrees; and <Condition (3-1)> assuming that an incident angle of light incident perpendicularly on a surface of the specimen on a side of the low refractive index layer is 0 degree, when light is made incident on the specimen at an incident angle of from 5 degrees to 45 degrees at intervals of 5 degrees, specularly reflected light of the incident light is measured for an a* value and a b* value of the Lab color coordinate system, a square root of a square sum of the a* value and the b* value is calculated at each of the incident angles, and a slope of the square root of the square sum of the a* value and the b* value is calculated according to the following expression (A) among each of measurements, an angle $x_2$ (degree) that shows an inflection point where the slope changes from negative to positive satisfies 25 degrees≤$x_2$≤45 degrees:

$$\tan^{-1}[(\sqrt{(a^*_{n+1})^2+(b^*_{n+1})^2}-\sqrt{(a^*_n)^2+(b^*_n)^2})/5] \quad (A)$$

wherein n represents an integer of from 1 to 8,
wherein the luminous reflectance Y value and the a* value and the b* value of the Lab color coordinate system of the antireflection film are measured using a specimen of the antireflection film comprising the transparent substrate having thereon the high refractive index layer and the low refractive index layer, and to which a black board is adhered with a transparent adhesive on a surface of the transparent substrate opposite to the high refractive index layer.

2. The antireflection film according to claim 1, wherein when a sum (S) of the absolute value of the a* value and the absolute value of the b* value is calculated at each of incident angles of from 5 to 45 degrees, an accumulated value ($SC_{5-45}$) of the sum satisfies the following condition (2-2):

$$SC_{5-45} \leq 34.0 \quad (2-2).$$

3. The antireflection film according to claim 1, wherein a sum ($S_5$) of the absolute value of the a* value and the absolute value of the b* value at an incident angle of 5 degree satisfies the following condition (2-3):

$$2.0 \leq S_5 \leq 5.0 \quad (2-3).$$

4. The antireflection film according to claim 1, wherein a sum ($S_{45}$) of the absolute value of the a* value and the absolute value of the b* value at an incident angle of 45 degree satisfies the following condition (2-4):

$$S_{45} \leq 8.0 \quad (2-4).$$

5. The antireflection film according to claim 1, wherein a ratio of a sum ($S_5$) of the absolute value of the a* value and the absolute value of the b* value at an incident angle of 5 degree and the $S_{min}$ satisfies the following condition (2-5):

$$1.6 \leq S_5/S_{min} \quad (2-5).$$

6. The antireflection film according to claim 1, wherein when a sum (S) of the absolute value of the a* value and the absolute value of the b* value is calculated at each of incident angles of from 35 to 45 degrees, a standard deviation ($S\sigma_{35-45}$) of the sum satisfies the following condition (2-6):

$$S\sigma_{35-45} \leq 1.65 \quad (2-6).$$

7. The antireflection film according to claim 1, wherein when the square root of the square sum of the a* value and the b* value is calculated at each of the incident angles of from 5 to 45 degrees, and an absolute value of a slope of the square root of the square sum of the a* value and the b* value is calculated according to the following expression (B) among each of measurements, a maximum value of the absolute values is 17.3 or less:

$$|\tan^{-1}[(\sqrt{(a^*_{n+1})^2+(b^*_{n+1})^2}-\sqrt{(a^*_n)^2+(b^*_n)^2})/5]| \quad (B)$$

wherein n represents an integer of from 1 to 8.

8. The antireflection film according to claim 1, wherein the antireflection film has a hardcoat layer between the transparent substrate and the high refractive index layer.

9. A display device comprising a display element having thereon the antireflection film according to claim 1 in such a manner that a side of the transparent substrate of the antireflection film is directed to a side of the display element.

10. The display device according to claim 9, wherein the display device contains a touch-sensitive panel on the display element, and the antireflection film is disposed on the touch-sensitive panel.

11. The display device according to claim 9, wherein the display element has a number of pixels of 3,840×2,160 or more.

12. A method for selecting an antireflection film comprising:

a transparent substrate having thereon a high refractive index layer and a low refractive index layer, the method comprising judging whether a specimen comprising the antireflection film exhibits a luminous reflectance Y value and an a* value and a b* value of the Lab color coordinate system that satisfy the condition (1) and satisfy at least any one of the condition (2-1) and the condition (3-1):

<Condition (1)> assuming that an incident angle of light incident perpendicularly on a surface of the specimen on a side of the low refractive index layer is 0 degree, when light is made incident on the specimen at an incident angle of 5 degrees, specularly reflected light of the incident light has a luminous reflectance Y value of 0.20% or less;

<Condition (2-1)> assuming that an incident angle of light incident perpendicularly on a surface of the specimen on a side of the low refractive index layer is 0 degree, when light is made incident on the specimen at an incident angle of from 5 degrees to 45 degrees at intervals of 5 degrees, specularly reflected light of the incident light is measured for an a* value and a b* value of the Lab color coordinate system, and a sum (S) of an absolute value of the a* value and an absolute value of the b* value is calculated at each of the incident angles, an incident angle $x_1$ (degree) that shows the minimum value ($S_{min}$) of the sum satisfies 20 degrees≤$x_1$≤30 degrees; and <Condition (3-1)> assuming that an incident angle of light incident perpendicularly on a surface of the specimen on a side of the low refractive index layer is 0 degree, when light is made incident on the specimen at an incident angle of from 5 degrees to 45 degrees at intervals of 5 degrees, specularly reflected light of the incident light is measured for an a* value and a b* value of the Lab color coordinate system, a square root of a square sum of the a* value and the b* value is calculated at each of the incident angles, and a slope of the square root of the square sum of the a* value and the b* value is calculated according to the following expression (A) among each of measurements, an angle $x_2$ (degree) that shows an inflection point where the slope changes from negative to positive satisfies 25 degrees $\leq x_2 \leq$ 45 degrees:

$$\tan^{-1}[(\sqrt{(a^*_{n+1})^2+(b^*_{n+1})^2}-\sqrt{(a^*_n)^2+(b^*_n)^2})/5] \quad (A)$$

wherein n represents an integer of from 1 to 8, wherein the specimen further comprises a black board adhered with a transparent adhesive on a surface of the transparent substrate opposite to the high refractive index layer.

\* \* \* \* \*